Patented Feb. 1, 1938

2,106,983

UNITED STATES PATENT OFFICE 2,106,983

WOOD PRESERVATIVE

Kenneth H. Klipstein, Short Hills, N. J., assignor to Calco Chemical Co., Inc., Bound Brook, N. J., a corporation of Delaware No Drawing. Application February 27, 1937, Serial No. 128,137

1 Claim. (Cl. 167—32)

This invention relates to wood preservatives and more particularly to wood preservatives using betanaphthol as a toxic material.

In the past, betanaphthol has been used extensively as a wood preservative particularly in the prevention of attack by termites. Betanaphthol possesses a number of very desirable characteristics as a termite proofing material. It is cheap, highly toxic to termites, but not toxic to human beings. It does not discolor the wood and has no serious odor. However, betanaphthol has a very serious drawback which has militated against its use as a preservative; this is the low solubility in petroleum hydrocarbons which are used as penetrants or thinners in the wood preserving industry. Betanaphthol dissolves in petroleum spirits, such as kerosene, only to the extent of .5% which is too dilute to be really effective for wood preserving.

It has been proposed in the past to use the butyl ether of ethylene glycol, (butyl Cellosolve), as a mutual solvent for betanaphthol and petroleum hydrocarbons. This compound is effective and extensive amounts of betanaphthol have been used in wood preservatives with butyl Cellosolve as a mutual solvent. Despite the satisfactory characteristics of butyl Cellosolve as a mutual solvent, however, the process has not achieved as wide use as it deserves because of the high price of butyl Cellosolve.

According to the present invention, diacetone alcohol is used as a mutual solvent for betanaphthol and petroleum hydrocarbons. Diacetone alcohol has all of the advantages of butyl Cellosolve and costs but little over half as much. Betanaphthol will dissolve in its own weight of diacetone alcohol, and diacetone alcohol is miscible with kerosene to the extent of 7–8%. To obtain still greater miscibility of the diacetone alcohol with kerosene a secondary solvent may be used such as butyl Cellosolve, mono- or dichlorbenzene.

The invention will be described in greater detail in conjunction with the following specific examples:

Example 1

30 kgs. of betanaphthol are dissolved in 50 liters of diacetone alcohol. This solution is mixed with sufficient solvent naphtha to bring the solution up to 1000 liters and this can then be used for wood preservative at the normal temperature of 25–28° C. If temperatures much below 25° C. are used, a certain tendency to separate into layers will be noticed. However, if the temperature is maintained at 25° C. or above there is no trouble. Wood impregnated with this solution offers excellent resistance to the attack of termites and the toxicity of the betanaphthol is in no way diminished by the presence of diacetone alcohol.

Example 2

30 kgs. of betanaphthol are dissolved in a mixture of 50 liters of diacetone alcohol and 20 liters of butyl Cellosolve. To this solution naphtha is added to bring the solution up to a volume of 1000 liters. The solution has the same effectiveness as that of Example 1 but it does not separate into layers at 10° C.

Example 3

30 kgs. of betanaphthol are dissolved in a mixture of 50 liters of diacetone alcohol and 50 liters of monochlorbenzene and naphtha is added to bring the volume up to 1000 liters. This solution is fully as effective as that of Example 1 but shows no separation into layers at 15° C. The monochlorbenzene may be replaced with the same amount of orthodichlorbenzene and gives a solution having approximately the same properties.

I claim:

An insecticidal composition comprising a volatile petroleum solvent, betanaphthol and diacetone alcohol.

KENNETH H. KLIPSTEIN.